United States Patent [19]

Duguay et al.

[11] Patent Number: 4,715,672
[45] Date of Patent: Dec. 29, 1987

[54] OPTICAL WAVEGUIDE UTILIZING AN ANTIRESONANT LAYERED STRUCTURE

[75] Inventors: Michel A. Duguay, Fair Haven; Thomas L. Koch, Middletown, both of N.J.; Yasuo Kokubun, Yokohama, Japan; Loren N. Pfeiffer, Morristown, N.J.

[73] Assignee: American Telephone and Telegraph Company, Murray Hill, N.J.

[21] Appl. No.: 816,199

[22] Filed: Jan. 6, 1986

[51] Int. Cl.⁴ .............................................. G02B 6/10
[52] U.S. Cl. ............................. 350/96.12; 350/96.34
[58] Field of Search ............... 350/96.11, 96.12, 96.13, 350/96.14, 96.34

[56] References Cited

U.S. PATENT DOCUMENTS

| H000,077 | 7/1986 | Yao et al. | 350/96.12 |
| 4,006,964 | 2/1977 | Mahlein et al. | 350/96.12 X |
| 4,466,694 | 8/1984 | MacDonald | 350/96.19 |

FOREIGN PATENT DOCUMENTS

| 0037263 | 10/1981 | European Pat. Off. | 350/96.12 |
| 57-14810 | 1/1982 | Japan | 350/96.12 |
| 57-93304 | 6/1982 | Japan | 350/96.12 |

OTHER PUBLICATIONS

Proc. of IEEE, May 1974, "The Grating Guide-A Component for Integrated Optics", A. J. Fox, pp. 644-645.
Optics Comm., vol. 19, No. 3, Dec. 1976, "Bragg Reflection Waveguides", P. Yeh et al, pp. 427-430.
App. Phys. Lett., vol. 30, No. 9, May 1, 1977, "Observation of Confined Propagation in Bragg Waveguides", A. Y. Cho et al, pp. 471-472.
App. Phys. Lett., 42(7), Apr. 1, 1983, "A Low-Scattering Graded-Index $SiO_2$ Planar Optical Waveguide Thermally Grown on Silicon", D. E. Zelmon, pp. 565-566.
App. Phys. Lett., 43(6), Sep. 15, 1983, "Low-Loss Integrated Optical Waveguides Fabricated by Nitrogen Ion Implantation", I. K. Naik, pp. 519-520.
SPIE, vol. 578, 1985, "Use of Thermal Nitridation to Fabricate Low Loss Planar Optical Waveguides in $SiO_2$", D. E. Zelmon et al, pp. 100-101.

Primary Examiner—John Lee
Attorney, Agent, or Firm—Daniel D. Dubosky; Gregory C. Ranieri

[57] ABSTRACT

A planar silicon dioxide waveguide with low loss for the TE mode has been built on a silicon wafer by separating the waveguide from the substrate with a relatively thin layer of polycrystalline silicon and a layer of silicon dioxide having a combined thickness less than that of the waveguide. The separating layers provide a high antiresonant reflectivity which is operative over a broad range of wavelengths.

7 Claims, 3 Drawing Figures

OPTICAL WAVEGUIDE UTILIZING AN ANTIRESONANT LAYERED STRUCTURE

BACKGROUND OF THE INVENTION

In recent years there has been considerable interest in building low-loss optical waveguides on various planar substrates. These waveguides are needed for numerous devices such as directional couplers, filters, switches, and optical interconnections for electronic circuits, to name just a few.

The tremendous technical progress in electronic devices built on silicon and gallium arsenide substrates has given rise to the need for constructing optical waveguides on these materials. Gallium arsenide devices such as lasers and FET's have been built on silicon wafers, so that the possibility now exists of interconnecting silicon electronic circuits with optical waveguides, provided these can be built with a sufficiently low loss. The extremely high bandwidth of optical waveguides would allow one to build processing systems operating at rates of tens of gigabits per second, opening the way to important applications in communications and computers.

Much effort has been directed at constructing optical waveguides on silicon wafers because they are mechanically sturdy and readily lend themselves to integration with silicon electronic circuits. A common approach has been to first grow a layer of silicon dioxide ($SiO_2$) by thermal oxidation of the silicon substrate (to be referred to hereafter as "thermal $SiO_2$"), and then to form on top of the thermal $SiO_2$ a layer of $SiO_2$ doped with elements that cause a slight increase $\Delta n$ in the refractive index relative to that of pure $SiO_2$. Another approach has been to deposit on top of the thermal $SiO_2$ a layer of silicon nitride ($Si_3N_4$) or of titanium dioxide ($TiO_2$), which have refractive indexes of 2.1 and 1.7 respectively. In these waveguides optical power is partially confined to the higher index layer by the standard process of total internal reflection at the interface between the two layers.

Two problems that have been encountered with previous approaches are that the doped $SiO_2$ or the deposited $Si_3N_4$ or $TiO_2$ are more lossy than pure $SiO_2$, and optical confinement is often weak leading to a strong evanescent field at the silicon substrate. Because silicon has a high refractive index (approximately 3.5), the evanescent field becomes a propagating wave in the silicon substrate and causes a substantial loss of power by radiation into the substrate.

Various possibilities exist to minimize this radiative loss. One approach is to use a thick layer of the high-index material, like $Si_3N_4$ or $TiO_2$, in order to better confine the optical power to the top layer. But this often leads to higher losses and to deleterious higher order modes, and also restricts the mode size to small dimensions which poorly couple to optical fibers.

In another approach, an extremely thick layer of $SiO_2$ is grown over the silicon substrate by thermal oxidation; this thick oxide layer keeps the silicon substrate as far out as possible on the tail of the evanescent field, thus reducing the "leakage" of optical power into the substrate. But this extra-thick oxide may require several days, sometimes even weeks, of growth time to achieve the desired degree of isolation.

SUMMARY OF THE INVENTION

In accordance with the present invention, a planar waveguide is provided on a substrate in a layer of optical material having an index of refraction lower than that of the substrate by separating the waveguiding layer from the substrate with at least one antiresonant reflecting element. The antiresonant reflecting element consists of a relatively thin layer of high index material adjacent to the waveguiding layer followed by a layer of lower index material, which in the simplest case is adjacent to the substrate. The high index layer has an optimum thickness approximately equal to an odd multiple of one-quarter wavelength of light in the high index material, and the second layer of the antiresonant reflecting element has an optimum thickness approximately equal to an odd multiple of one-half the thickness of the waveguiding layer.

In one embodiment shown, a silicon dioxide waveguiding layer is separated from a silicon substrate by an antiresonant reflecting element consisting of a thin layer of amorphous or polycrystalline silicon adjacent to the waveguide and a layer of silicon dioxide adjacent to the silicon substrate. In a second embodiment shown, two sets of antiresonant reflecting elements are positioned between the waveguiding layer and the substrate in order to achieve lower losses in the waveguiding layer.

BRIEF DESCRIPTION OF THE DRAWING

The invention, together with its various features and advantages, can be more readily understood after reading the following detailed description taken in conjunction with the accompanying drawings, wherein:

FIG. 3 shows another waveguide constructed in accordance with the present invention.

DETAILED DESCRIPTION

Figure 1:
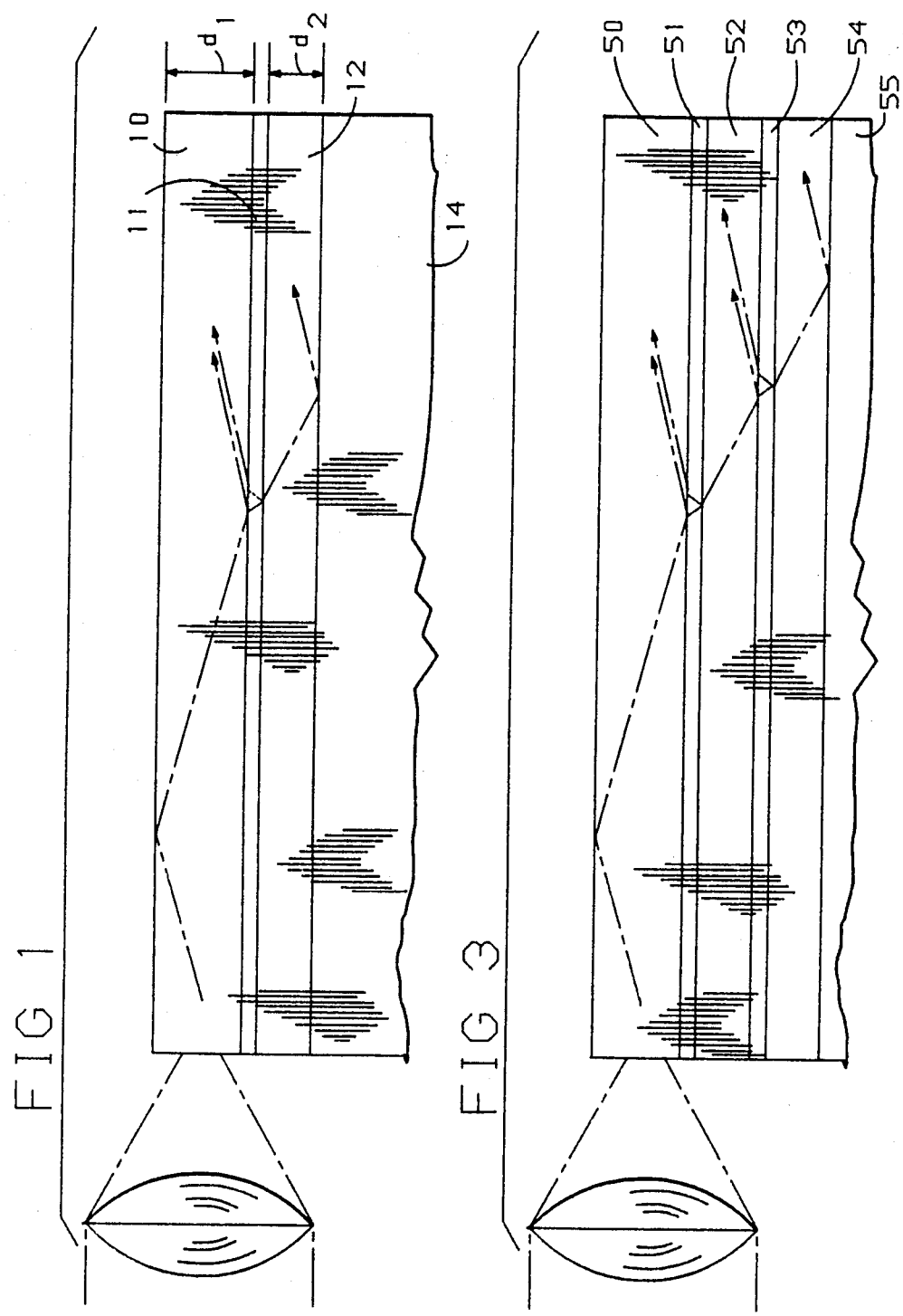
FIG. 1 is a schematic diagram of one embodiment of a waveguide constructed in accordance with the present invention.

In FIG. 1, an embodiment of the invention is shown where a "core" guiding layer 10 of silicon dioxide ($SiO_2$) is underlined by an antiresonant reflecting layer 11 of polycrystalline silicon (polysilicon), which is itself underlined by a layer 12 of $SiO_2$ grown by thermal oxidation of the underlying silicon substrate 14. As will be apparent to those skilled in the art after the following explanation of the operation of the disclosed device, antiresonant reflecting layer 11 may also be fabricated by using amorphous silicon with a small increase in the amount of expected waveguide loss. For wavelengths near 1.3 micron, of high interest to optical communications, the top $SiO_2$ layer was fabricated with a thickness $d_1$ of four micrometers ($\mu$m), the polysilicon layer thickness, t, was about 0.1 $\mu$m thick, and the thermally grown $SiO_2$ thickness $d_2$ was made to be about one-half of the top $SiO_2$ thickness, that is, with a thickness of about 2 $\mu$m.

In order to measure the propagation loss for the waveguides which were fabricated, several waveguides were cut by cleaving to various lengths and the total waveguide loss was measured. The slope of the loss versus waveguide length gave the propagation loss in the guide, i.e. the loss due to attenuation. The loss for the TE mode was measured at 0.4 dB/cm. For the TM mode the loss of 81 dB/cm showed that the device is an excellent polarizer.

The action of the polysilicon layer and silicon dioxide layer in achieving waveguiding in accordance with the present invention can be better understood after considering a simple analysis of the action of the layers on the light being guided. Since all components of the modes that are being guided in the waveguiding layers have the same phase variation in the direction of propagation, it is sufficient to consider only the phase variations that occur in the component of light that is perpendicular to the surface of the several layers. A consideration that must be met in order for a mode to be guided in the waveguiding layer is that the round trip in a direction perpendicular to the waveguiding surfaces must result in a phase shift equal to some multiple of $2\pi$ including the phase shifts that are encountered at the reflecting boundaries. This criteria may be applied to the light that is guided within the waveguiding layer and reflected with an angle of $\theta$ from a perpendicular that is drawn to the boundary of the waveguide. For a waveguiding layer having a thickness, $d_1$, that is greater than a few half wavelengths in the guiding material, i.e., for $d_1 \gg \lambda/2n_1$, the condition that must be satisfied in order for any mode to be guided is approximated by the following equation:

$$\cos \theta \approx \frac{\lambda}{2n_1 d_1} L \quad (1)$$

where $\lambda$ is equal to the wavelength of light being transmitted, $n_1$ is equal to the index of refraction in the waveguiding layer, $d_1$ is the thickness of the waveguiding layer, and L is any integer beginning with one. For L equal to one the condition represents transmission of the fundamental mode. Equation 1 represents the angle $\theta$ which must be satisfied in order for any particular mode to be guided within a waveguide having an index of refraction $n_1$ and a thickness $d_1$.

If the light that enters the high index layer of polycrystalline silicon is to return with the same phase after having been reflected from the lower silicon dioxide layer the following condition must be satisfied:

$$(2t)\frac{(2\pi n_2)}{\lambda}\cos\Phi = \pi + 2\pi N \quad (2)$$

where t is the thickness of this high index layer, $n_2$ is the index of refraction of this high index layer, $\Phi$ is the angle relative to the perpendicular at which the particular mode propagates in the high index layer, and N is equal to zero or one or any integer. By using Snell's law, the two angles $\theta$ and $\Phi$ may be related and the thickness t of the high index layer may be approximately represented by the following equation:

$$t \approx \frac{\lambda}{4n_2}(2N+1)\left\{1 - \frac{n_1^2}{n_2^2} + \frac{\lambda^2}{4n_2^2 d_1^2}\right\}^{-\frac{1}{2}} \quad (3)$$

As indicated by equation (3), if the index of refraction of the high index layer is sufficiently greater than that of the waveguide layer, the thickness t is approximately equal to an odd multiple of one-quarter wavelength of the light that is guided in the high index layer. This condition gives an insight as to how the high degree of reflection is achieved. This approximately one-quarter wavelength thickness corresponds to an antiresonant condition of a Fabry-Perot cavity. While the resonances of a Fabry-Perot cavity lead to spectrally narrow high transmission "windows", the anti-resonances lead to spectrally broad high reflection windows. Thus the light that impinges is neither transmitted nor absorbed but is instead reflected, and this condition will be operative over a broad range of wavelengths.

If the light that is transmitted through the high index layer into the silicon dioxide layer adjacent to the substrate is considered, an equation can be written in order to require that this light also return in phase thereby providing additional constructive interference. This requirement for the silicon dioxide layer next to the substrate in FIG. 1 results in the following equation:

$$\frac{d_2}{d_1} \approx \frac{(2M+1)}{2} \quad (4)$$

where $d_2$ is the thickness of this reflecting silicon dioxide layer, and M is equal to zero or one or any integer. This condition leads to an antiresonant condition in this layer as well. As indicated by the equation, this reflecting silicon dioxide layer should have a thickness $d_2$ equal at least to one-half of the thickness of the waveguiding layer, but may have a thickness equal to any odd multiple of one-half of the thickness of the waveguiding layer.

As can be seen by the foregoing analysis, the high index layer of polysilicon and the silicon dioxide layer adjacent to the substrate essentially provide an antiresonant reflecting element. This action is doubly effective, resulting from both the antiresonant character of the Fabry-Perot cavity created by the high index layer and the additional antiresonance of the silicon dioxide layer adjacent to the substrate.

Figure 2:
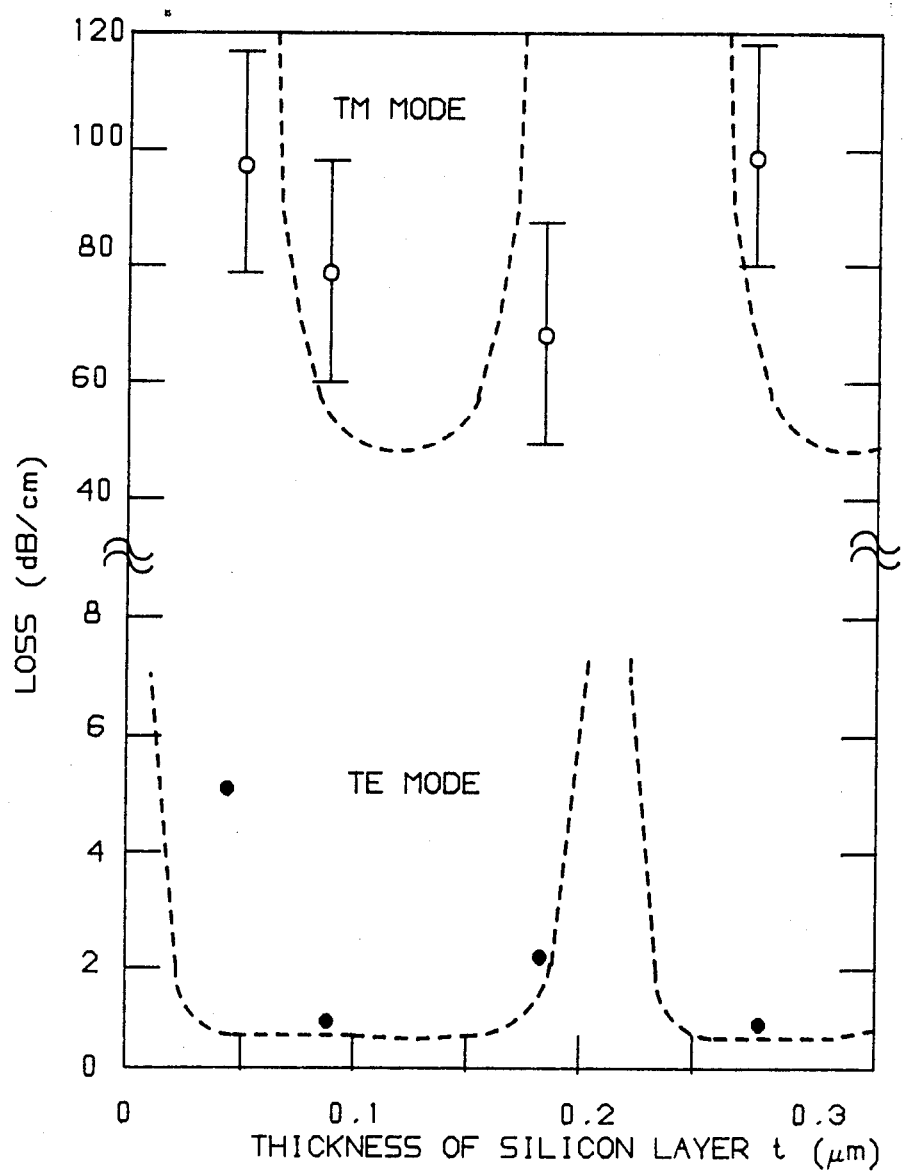
FIG. 2 shows curves depicting the theoretically predicted loss for the TE and TM modes in a waveguide of the type shown in FIG. 1 as a function of the thickness (t) of the polycrystalline silicon layer, and the dots represent experimental measurements of the loss for given thicknesses.

A series of measurements were made for waveguides with $d_1 = 4.0$ $\mu$m and $d_2 = 2.0$ $\mu$m, and various thicknesses t of polysilicon. The results are shown by the dots in FIG. 2, which also shows the theoretical predictions for the TE and the TM modes using the foregoing mathematical and physical considerations. The optimum thickness of the polysilicon layer is about 0.1 $\mu$m in this case. Since the waveguiding action is based on an antiresonant phenomenon, the minimum is broad so that the manufacturing requirements on thickness uniformity can be plus or minus 10 percent or so, a tolerance that can be easily met.

Lateral guiding can be easily achieved by etching shallow channels (several thousand angstroms is adequate) in the upper $SiO_2$ layer to provide a ridge loading. Other techniques such as pre-etching the lower substrate prior to deposition should also be possible.

The guide structure in the disclosed device gives very large loss discrimination against higher order modes. Simple leaky guides in general have a loss which increases roughly quadratically with mode number, but the structure studied here is much more discriminating than this. For the device disclosed, the fundamental mode loss is calculated to be 0.25 dB/cm, while the second mode has a loss of 99 dB/cm, and the third mode has a loss of 21 dB/cm. This behavior is expected since the second mode is actually resonant in the lower $SiO_2$ layer which enhances transmission into the substrate, with the third mode again acquiring the desired antiresonant structure but with higher transmitting large incidence angles on the reflecting lower structure, and more bounces per unit length as well.

In FIG. 3 a waveguiding layer 50 of silicon dioxide is established on a silicon substrate 55 by separating the waveguiding layer 50 from the substrate by two sets of antiresonant reflecting elements. A polysilicon layer 51 and a silicon dioxide reflecting layer 52 provide the first antiresonant reflecting element adjacent to the waveguide 50. A second polysilicon layer 53 and a second silicon dioxide reflecting layer 54 serve as the second antiresonant reflecting element and are positioned with silicon dioxide layer 54 immediately adjacent to substrate 55.

The two element structure shown in FIG. 3 allows one to achieve even lower losses, estimated to be on the order of 0.1 dB per meter provided material losses in the high index layers can be made sufficiently small. Such a low loss would meet the requirements of most integrated optics devices.

As is well-known in the art, channel waveguides can be defined by various photolithographic techniques. The classic one is the ridge-loading technique used in ridge-waveguide lasers. These, as well as other techniques can be used in conjunction with the planar waveguide structures described herein in order to build integrated optics devices.

What is claimed is:

1. An optical waveguide comprising first optical material structured with boundaries to guide light of a selected wavelength in a predetermined direction, and means juxtaposed with said boundaries for establishing an antiresonant reflection for a component of light propagating in a direction perpendicular to said predetermined direction including a second optical material of predetermined thickness adjacent to said first optical material and having an index of refraction greater than that of said first optical material, and a third optical material adjacent to said second optical material and having an index of refraction less than that of said second optical material, said predetermined thickness of said second optical material is approximately equal to an odd multiple of one-quarter wavelength of light in said second optical material, characterized in that, said first optical material is fabricated as a planar waveguide having a thickness $d_1$, and said third optical material is fabricated as a layer having a thickness $d_2$ which is approximately equal to an odd multiple times one-half of the thickness $d_1$.

2. An optical waveguide as defined in claim 1 wherein said first optical material is silicon dioxide, said second optical material is polycrystalline silicon, and said third optical material is silicon dioxide.

3. An optical waveguide as defined in claim 1 wherein said first optical material is silicon dioxide, said second optical material is amorphous silicon, and said third optical material is silicon dioxide.

4. In an optical device the combination comprising a substrate having a surface, a waveguiding layer of optical material, and means juxtaposed between said waveguiding layer and the surface of said substrate including a first reflecting layer adjacent to said optical material having an index of refraction higher than that of said optical material and a second reflecting layer adjacent to said first reflecting layer having an index of refraction lower than that of said first reflecting layer, the thickness of said first reflecting layer being approximately equal to an odd multiple of one-quarter wavelength of light in said first reflecting layer, characterized in that, said waveguiding layer of optical material has a thickness $d_1$, and said second reflecting layer adjacent to said first reflecting layer has a thickness $d_2$ which is approximately equal to an odd multiple times one-half of the thickness $d_1$.

5. In an optical device as defined in claim 4 wherein said substrate is fabricated from silicon.

6. In an optical device as defined in claim 5 wherein said waveguiding layer is silicon dioxide, said first reflecting layer is polycrystalline silicon, and said second reflecting layer is silicon dioxide.

7. In an optical device as defined in claim 5 wherein said waveguiding layer is silicon dioxide, said first reflecting layer is amorphous silicon, and said second reflecting layer is silicon dioxide.

* * * * *